(12) United States Patent
Barchasz et al.

(10) Patent No.: US 9,166,255 B2
(45) Date of Patent: Oct. 20, 2015

(54) LITHIUM-SULPHUR (LI-S)-TYPE ELECTROCHEMICAL BATTERY AND PRODUCTION METHOD THEREOF

(75) Inventors: Celine Barchasz, Fontaine (FR); Sebastien Patoux, Saint Nicolas de Macherin (FR); Yvan Reynier, Saint Egreve (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 57 days.

(21) Appl. No.: 14/342,051

(22) PCT Filed: Aug. 31, 2012

(86) PCT No.: PCT/EP2012/066936
§ 371 (c)(1),
(2), (4) Date: Feb. 28, 2014

(87) PCT Pub. No.: WO2013/030321
PCT Pub. Date: Mar. 7, 2013

(65) Prior Publication Data
US 2014/0220453 A1   Aug. 7, 2014

(30) Foreign Application Priority Data

Sep. 2, 2011  (FR) .................................. 11 57801

(51) Int. Cl.
*H01M 6/14* (2006.01)
*H01M 10/0568* (2010.01)
*H01M 4/136* (2010.01)
(Continued)

(52) U.S. Cl.
CPC .......... *H01M 10/0568* (2013.01); *H01M 4/136* (2013.01); *H01M 4/5815* (2013.01); *H01M 4/661* (2013.01); *H01M 4/669* (2013.01); *H01M 4/806* (2013.01); *H01M 4/808* (2013.01);
(Continued)

(58) Field of Classification Search
CPC .............................................. H01M 2300/0017
See application file for complete search history.

(56) References Cited

U.S. PATENT DOCUMENTS 4,410,609 A   10/1983   Peled et al.
7,354,680 B2   4/2008   Mikhaylik
(Continued)

FOREIGN PATENT DOCUMENTS

GB        2 084 391       4/1982
WO        2011 059766     5/2011

OTHER PUBLICATIONS

Ellis, B. L. et al. "Positive Electrode Materials for Li-Ion and Li-Batteries" Chem. Mater., vol. 22, No. 3, pp. 691-714, 2010 XP 55027424.

(Continued)

*Primary Examiner* — Jane Rhee
(74) *Attorney, Agent, or Firm* — Oblon, McClelland, Maier & Neustadt, L.L.P.

(57) ABSTRACT

The invention relates to a novel lithium-sulphur type electrochemical battery A.
According to the invention, the positive electrode (1) is made solely from a porous electronic conductor substrate forming a current collector and the electrolyte contains lithium polysulphides ($Li_2Sn$) as sources of lithium and sulphur ions, said lithium polysulphides being formed ex-situ and not in the battery.
The invention also relates to a method for the production of said device.

15 Claims, 4 Drawing Sheets

(51) Int. Cl.
  *H01M 4/58* (2010.01)
  *H01M 4/66* (2006.01)
  *H01M 4/80* (2006.01)
  *H01M 10/052* (2010.01)

(52) U.S. Cl.
  CPC .... *H01M10/052* (2013.01); *H01M 2300/0017* (2013.01); *Y02E 60/122* (2013.01)

(56) References Cited

U.S. PATENT DOCUMENTS

| | | |
|---|---|---|
| 2002/0106561 A1 | 8/2002 | Lee et al. |
| 2006/0234126 A1 | 10/2006 | Kolosnitsyn et al. |
| 2010/0196757 A1 | 8/2010 | Kolosnitsyn et al. |
| 2011/0200883 A1 | 8/2011 | Cui et al. |
| 2012/0135291 A1 | 5/2012 | Patoux et al. |
| 2012/0189921 A1 | 7/2012 | Kolosnitsyn et al. |
| 2013/0101903 A1 | 4/2013 | Barchasz et al. |
| 2013/0108913 A1 | 5/2013 | Barchasz et al. |
| 2013/0157114 A1 | 6/2013 | Barchasz et al. |

OTHER PUBLICATIONS

Zheng, W. et al. "Novel nanosized adsorbing sulfur composite cathode materials for the advanced secondary lithium batteries" Electrochimica Acta, Elsevier, vol. 51, No. 7, pp. 1330-1335, 2006 XP 5223794.
International Search Report Issued Oct. 2, 2012 in PCT/EP12/066936 Filed Aug. 31, 2012.
U.S. Appl. No. 13/148,934, filed Feb. 13, 2012, Patoux, et al.
U.S. Appl. No. 13/704,607, filed Dec. 31, 2012, Barchasz, et al.
U.S. Appl. No. 13/704,643, filed Dec. 31, 2012, Barchasz, et al.
U.S. Appl. No. 13/704,608, filed Dec. 20, 2012, Barchasz, et al.
French Preliminary Search Report issued May 24, 2012 in Patent Application No. 1157801.
J. M. Tarascon, et al., "Issues and challenges facing rechargeable lithium batteries", Nature, vol. 414, Nov. 15, 2001, pp. 359-367.
Brian L. Ellis, et al., "Positive electrode materials for Li-ion and Li-batteries", Chem. Mater., vol. 22, 2010, pp. 691-714.
R. D. Rauh, et al., "A lithium/dissolved sulfur battery with an organic electrolyte", J. Electrochem. Soc.: Electrochemical Science and Technology, vol. 126, No. 4, Apr. 1979, pp. 523-527.
Joongpyo Shim, et al., "The lithium/sulfur rechargeable cell", Journal of the Electrochemical Society, vol. 149, No. 10, 2002, pp. A1321-A1325.
Young-Jin Choi, et al., "Effects of carbon coating on the electrochemical properties of sulfur cathode for lithium/sulfur cell", Journal of Power Sources, vol. 184, 2008, pp. 548-552.
Sang-Eun Cheon, et al., "Rechargeable lithium sulfur battery", Journal of the Electrochemical Society, vol. 150, No. 6, 2003, pp. A796 to A799.
Xiulei Ji, et al., "A highly ordered nanostructured carbon-sulphur cathode for lithium-sulphur batteries", Nature Materials, vol. 8, May 17, 2009, pp. 1-7.
Chengdu Liang, et al., "Hierarchically structured sulfur/carbon nanocomposite material for high-energy lithium battery", Chem. Mater., vol. 21, No. 19, 2009, pp. 4724-4730.
Duck-Rye Chang, et al., "Binary electrolyte based on tetra(ethylene glycol) dimethyl ether and 1,3-dioxolane for lithium-sulfur battery", Journal of Power Sources, vol. 112, 2002, pp. 452-460.
Bo Jin, et al., "Electrochemical properties of lithium-sulfur batteries", Journal of Power Sources, vol. 117, 2003, pp. 148-152.
D. Marmorstein, et al., "Electrochemical performance of lithium/sulfur cells with three different polymer electrolytes", Journal of Power Sources, vol. 89, 2000, pp. 219-226.
Renal Backov, "Chimie intégrative: interdisciplinarité en sciences chimiques", Recherche, vol. 7, 2008, pp. RE 105 1-14.
Doron Aurbach, et al., "On the surface chemical aspects of very high energy density, rechargeable Li-sulfur batteries", Journal of the Electrochemical Society, vol. 156, No. 8, 2009, pp. A694-A702.
Douglas T. Queheillalt, et al., "Synthesis of open-cell metal foams by templated directed vapor deposition", Journal of Materials Research, vol. 16, No. 4, Apr. 2001, pp. 1028-1036.

US 9,166,255 B2

LITHIUM-SULPHUR (LI-S)-TYPE ELECTROCHEMICAL BATTERY AND PRODUCTION METHOD THEREOF

TECHNICAL FIELD

The present invention relates to a lithium-sulphur type electrochemical battery (Li—S) comprising two electrodes based on different materials and an electrolyte.

In this type of battery, among said three constituents at least one contains a source of lithium, and one contains a source of sulphur.

The invention intends more particularly to increase the capacity restored by a Li—S type battery once discharged, and particularly during the first discharge.

PRIOR ART

In the field of electrochemical batteries, lithium is known as being the lightest solid element, thereby offering an attractive mass energy density.

Under development since 1991, lithium-ion (Li-ion) batteries offer much better performances in comparison with other known batteries (Pb, Ni—Cd, Ni-MH, etc.), enabling nearly 200 Wh·kg$^{-1}$ to be attained nowadays. The publication [1] clearly shows these performance differences. Thus, this type of Li-ion battery has enabled the rapid development of portable device technologies. In other words, Li-ion batteries are today more and more used as autonomous energy sources and are progressively replacing nickel-cadmium (Ni—Cd) and nickel-metal hydride (Ni-MH) batteries. As mentioned above, this evolution is explained by the continuous improvement of the performances of Li-ion batteries in terms of energy density, thereby conferring mass and volume energy densities markedly superior to those proposed by known batteries of other types, namely particularly more than 180 Wh·kg$^{-1}$ compared to only 30 to 35, 50, 100 Wh·kg$^{-1}$ for batteries respectively of acid-lead, Ni—Cd, Ni-MH type (see publication [1]).

At the present time, the Li-ion batteries market is dominated by the technology based on the pairing of lithium cobalt oxide $LiCoO_2$ at the positive electrode and graphite at the negative electrode. The rated voltage of these batteries is of the order of 3.6 V compared to 1.5 V for most other types of battery (Ni—Cd, Ni-MH, etc.). The volume and mass energy densities are respectively around 300 to 500 Wh·l$^{-1}$ and 160 to 200 Wh·kg$^{-1}$. These values are the highest among all batteries marketed at the present time. In addition, these batteries have a low self-discharge and a long lifetime (500, or even 1000 cycles).

Despite these remarkable performances attained, it may be considered that all current Li-ion batteries are close to a levelling off in terms of performances and the perspectives for improvement remain limited.

A novel type of lithium battery, based on sulphur, is standing out as a promising alternative, as analysed in the publication [2]. In other words, lithium-sulphur (Li—S) batteries thus seem to be able to constitute a promising alternative to known Li-ion batteries. In this type of Li—S battery, lithium reacts with sulphur according to the overall electrochemical reaction:

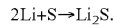

$$2Li+S \rightarrow Li_2S.$$

The potential difference created is around 2.1 V. The specific capacity of sulphur is 1675 mAh·g$^{-1}$.

During a discharge, lithium polysulphide intermediates, of formula $Li_2S_n$ (2<n<8), are formed.

They are more or less long chains of sulphur, associated with lithium ions and soluble in the electrolyte, as explained in the publication [3]. A cycling curve of a Li—S battery has been represented in FIG. 1.

Thus, to summarise, on account of its very high theoretical mass energy density, of the order of 2600 Wh·kg$^{-1}$, its low cost, its limited environmental impact and its natural abundance, sulphur appears as a very promising material. As described in the publication [4], it should be possible to elaborate Li—S batteries with a mass energy density much higher than that of known Li-ion batteries. The publication [4] evokes a more than twofold increase, i.e. a mass energy density of more than 400 Wh·kg$^{-1}$.

However, the drawbacks of currently envisaged Li—S batteries, in other words with a positive electrode based on sulphur, an electrolyte, preferably an organic liquid, and a lithium metal negative electrode, are multiple and numerous improvements are still necessary with respect to said positive electrode based on sulphur, the electrolyte and the separator, the negative electrode and the architecture to envisage marketing.

The first drawback is of a kinetic nature, since sulphur is intrinsically an insulating material, as indicated in the publication [5]. The second drawback is that sulphur is soluble in the envisaged organic electrolytes, as evoked in the publication [4].

Thereby solubilised, it corrodes the negative lithium electrode and is the main cause of the important self-discharge of Li—S batteries. Moreover, the lithium polysulphide intermediates are also soluble in the electrolyte and thus liable to react with the negative electrode. These intermediates thus also favour the self-discharge of Li—S batteries. Moreover, they are also the cause of the implementation of a mechanism that may be qualified as a shuttle mechanism that takes place during charge and which leads to a degradation of the performances of Li—S batteries, particularly the loss of coulombic efficiency. Finally, the resulting discharge product $Li_2S$ is, for its part, insoluble in the electrolyte and is an electronic insulator, as explained in the publication [6]. This product $Li_2S$ thus precipitates at the end of discharge and passivates the surface of the electrodes, which then become inactive. As a result, the practical capacities obtained are generally well below the theoretical capacity evoked above, typically of the order of 300 to 1000 mAh·g$^{-1}$ compared to the theoretical capacity of 1675 mAh·g$^{-1}$.

One may explain differently and more in detail the drawbacks of a Li—S battery as currently envisaged, in other words made of a positive electrode based on sulphur, an electrolyte and a lithium metal negative electrode. To produce the positive electrode based on sulphur, a widely used coating method for the production of electrodes is envisaged: the active material is initially mixed on the one hand with carbon in order to improve the overall electronic conductivity of the electrode and on the other hand with a binder, then coated on a metal sheet or strip forming the current collector. Generally speaking, it is known that the layer of coated material constituting the active material of the electrode has to be relatively porous to enable good penetration of the Li$^+$ ion conductor electrolyte.

Yet, the discharge mechanism of a currently envisaged Li—S battery consists firstly in a step of dissolution of the active material of the electrodes.

In fact, the sulphur reacts with the lithium to form lithium polysulphide intermediates, soluble in the organic electrolyte. This dissolution step leads to a collapse of the initial structure of the porous electrode. The available electrode surface is thereby reduced, and grains of active material risk being separated from the actual coated layer.

At the end of discharge, on the other hand, the species become not very soluble or even insoluble, and precipitate at the surface of the electrode. Since the deposited species ($Li_2S_2$, $Li_2S$, etc.) are highly insulating, they rapidly passivate the positive electrode and, due to this passivation, the thickness of the deposited active material is limited to several nanometers. The electrode surface is then crucial to enable the deposition of an important quantity of active material. However, the electrode surface is often damaged, as explained above, by the initial dissolution of the sulphur and the structure/residual porosity of the electrode do not make it possible to accommodate the deposition of the whole quantity of the final discharge product $Li_2S$ available in the medium.

In addition, this final product $Li_2S$ is twice as voluminous as sulphur S which contributes to the pulverisation of the electrode structure.

In conclusion, these phenomena of dissolution/precipitation, inherent in the discharge mechanism, are thus responsible for the practical restored capacity and the poor cycling stability of Li—S batteries.

Furthermore, it may be considered that the use of a negative electrode made of lithium metal can only also restrict the future marketing of Li—S batteries as currently envisaged. In fact, under development since the 1970s, lithium metal type batteries have not undergone the commercial development that Li-ion batteries have experienced, due to their dangerousness. In fact, the use of lithium metal can easily lead to the appearance of short-circuits during cycling, and hence a significant heating of the battery and a possible explosion. Accidents moreover occurred at the very start of the marketing of this type of batteries, which led to their rapid abandonment to the benefit of Li-ion batteries.

Henceforth, to overcome these disadvantages of Li—S batteries as currently envisaged, in other words with a positive electrode based on sulphur, an electrolyte and a lithium metal negative electrode, and thereby attempt to attain the promising theoretical performances, numerous teams are looking for improvements.

The firm Polyplus has made the choice, for example, as it set outs on its website http://www.polyplus.com/lisulfur.html, of developing protected electrode structures in order to insulate the negative lithium electrode from the polysulphide containing environment. More precisely, as already mentioned above, the negative lithium metal electrode is corroded by the species present in solution (sulphur or polysulphides) and a loss of active material may take place by deposition of $Li_2S$ (passivation) on this lithium-metal electrode. For instance, the firm Polyplus has demonstrated that the self-discharge and the drop in capacity may be considerably improved if the species do not have the opportunity to reach the lithium metal.

In a different manner, other teams are working on the optimisation of the positive electrode, with the purpose of limiting/preventing the dissolution of polysulphides and their diffusion through the electrolyte. For example, the team of L. Nazar announces in the publication [7] that it has developed a composite based on mesoporous carbon, which makes it possible to conserve, through adsorption, the active material within the electrode, which thereby limits the self-discharge and the loss of structure of the positive electrode. In a similar manner, the team of N. Dudney announces in the publication [8] that it has developed a composite of bimodal porosity, which makes it possible both to confine the polysulphides in the positive electrode and to have good wettability of the positive electrode by the electrolyte.

Finally, another way of improvement resides in the optimisation of the electrolyte, its composition and its structure. Numerous studies, such as that from which the publication [9] emanates, aim to optimise the composition of electrolytes in the form of organic liquids, by using ether solvents on account of their compatibility with the sulphur containing species. In fact, the solvents and the lithium salts play an important role in the electrochemical performances since they set the solubility of the species and their rate of diffusion. Other studies, such as those from which the publication [10] emanates, envisage "all-solid" ceramic based electrolytes because they assure perfect non-dissolution of the active material.

Finally, yet other studies such as that from which the publication [11] emanates, envisage polymer-gel electrolytes because they make it possible to limit the diffusion of species from one electrode to the other.

The aim of the invention is thus to propose a lithium-sulphur (Li—S) type battery that does not have all or part of the drawbacks of batteries of already known type.

A particular aim of the invention is to propose a lithium-sulphur type battery in which the capacity restored during cycles and more particularly during the first discharge is improved.

DESCRIPTION OF THE INVENTION

To do so, the subject matter of the invention is a lithium-sulphur type electrochemical battery comprising:
a positive electrode,
a negative electrode,
a separator inserted between the positive electrode and the negative electrode and impregnated with an electrolyte in liquid or polymer gel form.

According to the invention, the positive electrode is made from a porous electronic conductor substrate forming a current collector and in that the electrolyte contains lithium polysulphides ($Li_2S_n$) as sources of lithium and sulphur ions, said lithium polysulphides being formed ex-situ and not in the battery.

Lithium polysulphide is preferably taken to mean a compound of formula $Li_2S_n$ with n comprised between 4 and 8 inclusively.

The present invention consists of a combination between the source of lithium and of sulphur introduced directly into the electrolyte via the addition of lithium polysulphides and the use of a positive electrode made solely from a porous substrate forming the positive current collector.

Porous substrate is taken to mean in particular a substrate having a specific surface area greater than $10^{-2}$ $m^2/g$ and more particularly in which the open porosity is greater than 40%, preferably greater than 80%, even more preferably of the order of 88±5%.

Ex-situ is taken to mean that said lithium polysulphides are synthesised before their introduction into the battery.

According to the invention, the substrate is rigid and does not deteriorate under the effect of successive charge and discharge cycles.

According to the invention, the positive electrode does not comprise either polymer or polymeric binder, or additional electronic conductor.

Thanks to such a positive electrode, the drawbacks of positive electrodes according to the prior art are overcome, namely respectively collapse of structure, pulverisation of the electrode and loss of specific surface area capable of accommodating the deposition of insoluble and insulating active material.

According to the invention, the aim is to improve the capacity restored during the 1$^{st}$ discharge and during later cycles, thanks to the use of a current collector of rigid structure and of high porosity. The rigidity makes it possible to provide mechanical strength to the positive electrode during cycling, such that the quantity of active material deposited at each end of discharge may be constant, thereby improving the cycling stability. The use of a very porous current collector makes it possible, moreover, to accommodate an important deposition of species at the end of discharge, leading to an improvement of the practical restored capacity.

Preferably, the positive electrode according to the invention is a metal or carbon foam, or alternatively a mixture made of a metal foam covered with carbon or conversely a carbon foam covered with metal. Materials such as nickel, aluminium, stainless steel may advantageously be used. An example of nickel foam marketed under the denomination Incofoam® by the firm INCO is perfectly suitable as such within the scope of the invention. To obtain very specific characteristics concerning, for example, the developed specific surface area, the size of the porosities or the chemical nature of the materials, a synthesis of this foam may just as easily be envisaged within the scope of the invention. Various synthesis techniques exist and are widely presented in the literature: technique referred to as sol-gel, synthesis from a polymer referred to as "template", etc. [12].

Concerning the introduction of the source of sulphur, the latter is introduced in the form of lithium polysulphides dissolved in the electrolyte. In fact, these species are soluble in important quantity in organic electrolytes and their solubility can practically reach 10 mol·L$^{-1}$, as explained in the publication [13]. By controlling in this way the concentration of sulphur in the solution of polysulphides and the quantity introduced into the electrolyte, it is possible according to the invention to control the final capacity of the battery and to reach high energy densities. The inventors thus believe that it is possible to attain, thanks to the invention, a final capacity of a battery according to the invention of more than 100 mAh·cm$^{-2}$ for a button cell of the type of that marketed under the reference CR2032.

The essential advantage of the solution according to the invention is that the battery can then operate like a Li-ion type battery, the lithium source then being supplied directly in the form of ions in the electrolyte.

The positive current collector according to the invention in foam form may be associated with a conventional negative electrode, in other words without complex formulation such as graphite, silicon, tin, etc. Examples of conventional formulation of a negative electrode are described in the publication [14].

A subsequent advantage of using a positive electrode without sulphur according to the invention resides in the fact that the active material thereby introduced into the electrolyte does not require the preparation of a positive electrode composite, as usually carried out in lithium batteries, in other words with a substrate forming a current collector on which is deposited an active material. The use of a binder, of an electronic conductor additive is thereby avoided, making it possible to lighten the system in terms of weight, and particularly in terms of inactive weight from an electrochemical viewpoint.

In practice, preferably, the synthesis of lithium polysulphides is carried out by mixing lithium metal and elementary sulphur, in the desired proportions, and in a compatible solvent (ether). The raw materials dissolve progressively. They react to form polysulphides and give an intense brown coloration to the solution. In this configuration, care is taken nevertheless to adapt the quantity of lithium polysulphides introduced into the electrolyte, as a function of the specific surface area of positive electrode current collector available. In fact, this dictates the quantity of material that it is possible to deposit at the end of discharge. It may thus limit the quantity of polysulphides that can be used.

Conventional organic electrolyte solvents are carbonates, of the type PC (propylene carbonate), DMC (dimethyl carbonate), EC (ethylene carbonate), DEC (diethyl carbonate), etc. Ether type solvents may also be used, of the type DIOX (1,3-dioxolane), THF (tetrahydrofuran), DME (1,2-dimethoxyethane) or more generally the family of glymes of formula $CH_3O-[CH_2CH_2O]_n-CH_3$ (with n comprised between 1 and 10). Finally, other families of solvents such as sulphones (tetramethyl sulphone, ethyl methyl sulphone, etc.) may also be employed.

Preferably, the solvent is an ether or an ether mixture.

The positive electrode may be advantageously made from a metal or carbon based foam, preferably with the metal of the foam selected from nickel (Ni), aluminium (Al) or stainless steel.

Alternatively, the positive electrode may be made from a non-woven fabric based on carbon fibres or entangled metallised polymeric fibres.

The negative electrode, for its part, preferably comprises a current collector substrate on which is deposited a negative electrode material selected from carbon graphite, silicon, tin and lithium metal.

The electrolyte of the battery may be a liquid or polymer-gel. It is composed of a lithium salt, selected for example from $LiN(CF_3SO_2)_2$ (lithium bis[(trifluoromethyl)sulphonyl]imide or LiTFSI), $LiCF_3SO_3$ (lithium trifluoromethane sulphonate or LiTf or Li-triflate), $LiClO_4$, $LiAsF_6$, $LiPF_6$, $LiBF_4$, LiI, $LiR_FSO_3$, $LiCH_3SO_3$, $LiN(R_FSO_2)_2$, $LiC(R_FSO_2)_3$, $LiB(C_2O_4)_2$ (lithium bis(oxalato)borate or LiBOB), $LiN(CF_3CF_2SO_2)_2$ (lithium bis(perfluoroethylsulphonyl)imide or LiBETI). $R_F$ is a perfluoroalkyl group comprising between one and eight carbon atoms. In the case of a liquid electrolyte, the lithium salt is dissolved in an aprotic polar solvent (or mixture of solvents) and is supported by a separator arranged between the two electrodes of the battery. In the case of a polymer-gel electrolyte, the lithium salt is not dissolved in an organic solvent, but in a solid composite polymer such as PEO (polyethylene oxide), PAN (polyacrylonitrile), PMMA (polymethylmethacrylate), PVdF (polyvinylidene difluoride) or a derivative thereof. However, it is preferable to choose a liquid electrolyte, which makes it possible to dissolve an important quantity of lithium polysulphides, and which confers an important capacity to the battery. In addition, this type of electrolyte enables a better diffusion of species within the electrolyte, thereby assuring a more homogeneous deposit at the surface of the foam constituting the positive electrode according to the invention.

Furthermore, when the negative electrode used is made of lithium metal care is taken to assure its protection, since said lithium polysulphides are liable to be introduced directly into the electrolyte and thus in contact with the negative electrode. Thus, to do so, a protective layer may be deposited thereby insulating the electrolyte from the negative electrode.

It is possible for example to achieve the protection according to the patent application WO 02/41416. Alternatively, it is also possible to envisage adding, into the electrolyte, an additive enabling an efficient passivation of the lithium. Such an additive is for example presented in the publication [15]. The protection is then in-situ and efficient even when the "fresh" lithium is again deposited on the negative electrode (during charge).

The invention also relates to a method of producing a lithium-sulphur type battery comprising the implementation of a positive electrode, a negative electrode and a separator inserted between the positive electrode and the negative electrode and impregnated with an electrolyte in liquid or polymer gel form, characterised in that it further comprises the following steps:

a/ producing the positive electrode made solely from a porous substrate forming a current collector;

b/ introducing into the electrolyte lithium polysulphides ($Li_2S_n$) in order to constitute the source of lithium and sulphur ions.

"Made only of" is taken to mean that the positive electrode within the scope of the method of producing the battery does not comprise electrode materials and does not comprise polymeric binder which has become unnecessary in the absence of electrode material. In fact, according to the invention, the positive electrode active material is introduced uniquely into the electrolyte.

Preferably, step b/ is carried out before the introduction of the electrolyte into the battery.

Said lithium polysulphides are advantageously prepared ex-situ by dispersion of elementary sulphur and lithium metal in a solvent or mixture of solvents, then by addition of the solution obtained to the electrolyte.

The electrolyte may be composed of a lithium salt constituted of a lithium bis(trifluoromethanesulphonyl)imide (LiTFSI), the mixture of solvents is constituted of 1,3-dioxolane (DIOX) and polyethylene glycol dimethyl ether (PEGDME) or tetraethylene glycol dimethyl ether (TEGDME), said lithium polysulphides $Li_2S_8$ being dissolved beforehand in PEGDME or TEGDME.

BRIEF DESCRIPTION OF THE DRAWINGS

Other advantages and characteristics of the invention will become clearer on reading the detailed description of the invention given by way of illustration and non-limiting, with reference to the following figures among which.

DETAILED DESCRIPTION OF PARTICULAR EMBODIMENTS

Figure 1:
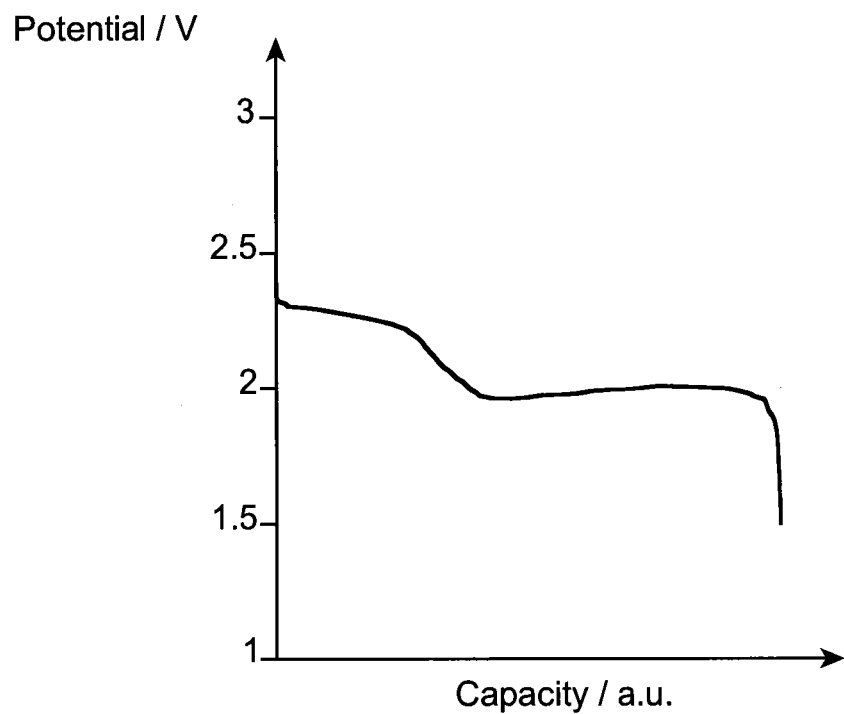
FIG. 1 represents the discharge curve of a lithium-sulphur Li—S electrochemical battery according to the prior art, FIG. 2 reproduces an image of a positive electrode according to the invention, taken by means of a scanning electron microscope.

For each of examples 1 to 4 according to the invention, one proceeds in the following manner to produce a Li—S type battery A according to the invention.

The positive electrode 1 is only made from metal, carbon or conductor polymer current collector formed by a porous substrate. Preferably, the developed specific surface area of the substrate 1 is important, greater than 0.01 $m^2/g$, preferably greater than 0.1 $m^2/g$. The porous substrate 1 is cut into the desired electrode dimensions and inserted as such into the battery without any other element, and necessarily not combined with a polymer binder, an electronic conductor additive or a source of solid sulphur (S for example).

A separator 2, for example of polyolefin type, is then deposited on the porous substrate 1.

As detailed hereafter for each of the examples, an electrolyte is prepared from $mol·L^{-1}$ of bis(trifluoromethanesulphonyl)imide lithium salt (LiTFSI), then dissolved in a mixture of ether containing solvents of optimised composition. Similarly, 1 $mol·L^{-1}$ lithium polysulphides $Li_2S_8$ are dissolved in the electrolyte, by dispersion of elementary sulphur and lithium metal in this solution.

The mixture is stirred, and, by chemical reaction of the sulphur with the lithium metal, soluble lithium polysulphides $Li_2S_8$ are thereby produced. The separator 2 is then impregnated with this organic liquid electrolyte, which makes it possible to assure the ionic contact between the two positive 1 and negative 3 electrodes within the battery A, but also the introduction of the active material into the battery A.

A negative electrode 3, made from a pellet of lithium metal, or any other negative electrode material, is deposited on the positive electrode 1/separator 3 stack impregnated with the electrolyte with the lithium polysulphides $Li_2S_8$.

Among negative electrode materials that may be envisaged, carbon graphite, silicon, tin or alloys formed from tin and/or silicon may be cited.

Figure 3:
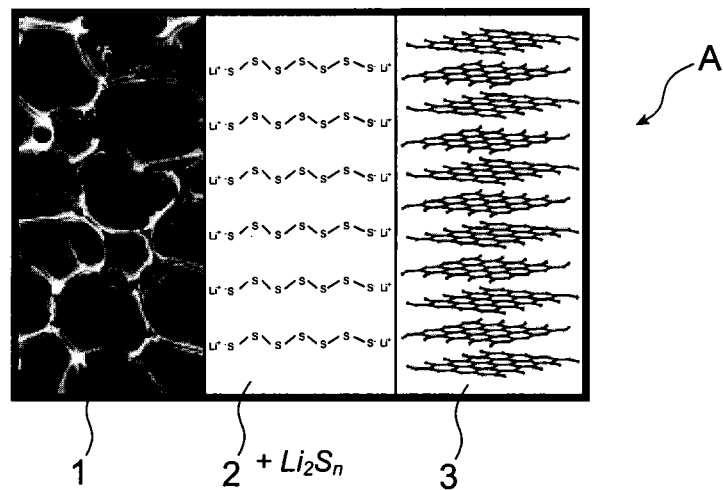
FIG. 3 is a schematic representation in transversal section of a Li—S electrochemical battery according to the invention (examples 1 to 4)

A Li—S type battery A according to the invention is thereby obtained with in combination a positive electrode made solely from a porous substrate 1 and a separator 2 in which the electrolyte contains said lithium polysulphides $Li_2S_8$ as lithium and sulphur ion sources: see FIG. 3.

The battery A may then be hermetically sealed according to already proven techniques to assure the final leak tightness.

Embodiment Examples 1 to 4 According to the Invention

Example 1

A sulphur containing electrolyte is made from:
bis(trifluoromethanesulphonyl)imide lithium salt (LiTFSI, marketed by the firm Aldrich);
1,3-dioxolane solvent (DIOX, marketed by the firm Aldrich);
tetraethylene glycol dimethyl ether solvent (TEGDME, marketed by the firm Aldrich);
lithium polysulphides $Li_2S_8$.

Said lithium polysulphides are dissolved beforehand at 1 $mol·L^{-1}$ in TEGDME. Elementary sulphur and lithium metal are dispersed in the solvent to obtain stoichiometry in $Li_2S_8$. After a certain heating and stirring time, all of the material has dissolved and reacted to give a viscous, brown coloured solution.

The electrolyte is then made of $mol·L^{-1}$ of LiTFSI, 50% by volume of 1 $mol·L^{-1}$ of $Li_2S_8$ in solution in TEGDME and 50% by volume of DIOX. In the end, the compositions are thus the following:
LiTFSI: 1 $mol·L^{-1}$
$Li_2S_8$: 0.5 $mol·L^{-1}$
TEGDME/DIOX: 50/50 in volume percent.

Figure 2:
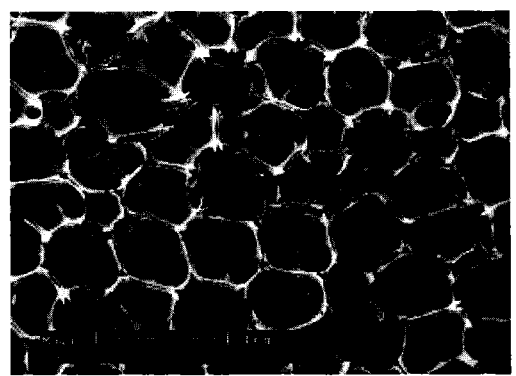

A battery A according to the invention of "button cell" type, typically such as that marketed under the reference CR2032, is then made with the following components:
- a positive electrode 1 of nickel foam (Incofoam®, Novamet) cut to 14 mm diameter. Such an electrode 1 is shown in FIG. 2: its porosity can reach up to 97% for a developed surface area of 0.033 m²·g⁻¹ as announced by the firm INCO: see http://www.incosp.com/;
- a separator 2 impregnated with the liquid electrolyte described above.
- a 130 µm thick negative lithium electrode 3, cut to 16 mm diameter and deposited on a stainless steel disc forming the negative current collector.

Example 2

A sulphur containing electrolyte is made from:
bis(trifluoromethanesulphonyl)imide lithium salt (LiTFSI, marketed by the firm Aldrich);
1,3-dioxolane solvent (DIOX, marketed by the firm Aldrich);
polyethylene glycol dimethyl ether solvent (PEGDME, marketed by the firm Aldrich);
lithium polysulphides $Li_2S_8$.

Said lithium polysulphides are dissolved beforehand at 1 mol·L⁻¹ in PEGDME. Elementary sulphur and lithium metal are dispersed in the solvent to obtain stoichiometry in $Li_2S_8$. After a certain heating and stirring time, all of the material has dissolved and reacted to give a viscous, brown coloured solution.

The electrolyte is then made of 1 mol·L⁻¹ of LiTFSI, 50% by volume of 1 mol·L⁻¹ of $Li_2S_8$ in solution in PEGDME and 50% by volume of DIOX. In the end, the compositions are thus:
LiTFSI: 1 mol·L⁻¹;
$Li_2S_8$: 0.5 mol·L⁻¹;
PEGDME/DIOX: 50/50 in volume percent.

A battery A according to the invention of "button cell" type, typically such as that marketed under the reference CR2032, is then formed with the following components:
- a positive electrode 1 of nickel foam (Incofoam®, Novamet) cut to 14 mm diameter. Such an electrode 1 is shown in FIG. 2: its porosity may reach up to 97% for a developed surface area of 0.033 m²·g⁻¹ as announced by the firm INCO: see http://www.incosp.com/;
- a separator 2 impregnated with the liquid electrolyte described above.
- a 130 µm thick negative lithium electrode 3, cut to 16 mm diameter and deposited on a stainless steel disc forming the negative current collector.

Example 3

A sulphur containing electrolyte is made from:
bis(trifluoromethanesulphonyl)imide lithium salt (LiTFSI, marketed by the firm Aldrich);
1,3-dioxolane solvent (DIOX, marketed by the firm Aldrich);
polyethylene glycol dimethyl ether solvent (PEGDME, marketed by the firm Aldrich);
lithium polysulphides $Li_2S_8$.

Said lithium polysulphides are dissolved beforehand at 1 mol·L⁻¹ in PEGDME. Elementary sulphur and lithium metal are dispersed in the solvent to obtain stoichiometry in $Li_2S_8$. After a certain heating and stirring time, all of the material has dissolved and reacted to give a viscous, brown coloured solution.

The electrolyte is then made of mol·L⁻¹ of LiTFSI, 50% by volume of 1 mol·L⁻¹ of $Li_2S_8$ in solution in PEGDME and 50% by volume of DIOX. In the end, the compositions are thus:
LiTFSI: 1 mol·L⁻¹;
$Li_2S_8$: 0.5 mol·L⁻¹;
PEGDME/DIOX: 50/50 in volume percent.

A battery A according to the invention of "button cell" type, typically such as that marketed under the reference CR2032, is then made with the following components:
- a positive electrode of non-woven carbon (marketed by the firm Freudenberg) cut to 14 mm diameter;
- a separator 2 impregnated with the liquid electrolyte described above.
- a 130 µm thick negative lithium electrode 3, cut to 16 mm diameter and deposited on a stainless steel disc forming the negative current collector.

Example 4

A sulphur containing electrolyte is made from:
bis(trifluoromethanesulphonyl)imide lithium salt (LiTFSI, marketed by the firm Aldrich);
1,3-dioxolane solvent (DIOX, marketed by the firm Aldrich);
polyethylene glycol dimethyl ether solvent (PEGDME, marketed by the firm Aldrich);
lithium polysulphides $Li_2S_8$.

Said lithium polysulphides are dissolved beforehand at 1 mol·L⁻¹ in PEGDME. Elementary sulphur and lithium metal are dispersed in the solvent to obtain stoichiometry in $Li_2S_8$. After a certain heating and stirring time, all of the material has dissolved and reacted to give a viscous, brown coloured solution.

The electrolyte is then made of mol·L⁻¹ of LiTFSI, 50% by volume of 1 mol·L⁻¹ of $Li_2S_8$ in solution in PEGDME and 50% by volume of DIOX. In the end, the compositions are thus:
LiTFSI: 1 mol·L⁻¹
$Li_2S_8$: 0.5 mol·L⁻¹
PEGDME/DIOX 50/50 in volume percent A battery A according to the invention of "button cell" type, typically such as that marketed under the reference CR2032, is then made with the following components:
- a positive electrode 1 of carbon foam (SR Carbon marketed by the firm Showa Denko, specific surface area of 0.19 m²/g) cut to 14 mm diameter;
- a separator 2 impregnated with the liquid electrolyte described above;
- a 130 µm thick lithium negative electrode 3, cut to 16 mm diameter and deposited on a stainless steel disc forming the negative current collector.

Comparative Example 1

An ink is made from:
active material (elementary sulphur such as the "Refined", marketed by the firm Aldrich);
carbon black (Super P®, marketed by the firm Timcal);
binder (polyvinylidene difluoride or PVdF, marketed by the firm Solvay) dissolved in N-methylpyrrolidone (NMP).

The ink is composed (by weight) of 80% sulphur, 10% carbon black and 10% binder. The quantity of NMP is adjusted to attain the optimal viscosity enabling easy deposition of the mixture. The ink is deposited by spread coating using a micrometric doctor blade on a 20 µm thick strip of aluminium. The coating is then dried at 55° C. for 24 h under air then cut into pellets of 14 mm diameter: the positive electrode 1 of this comparative example 1 is thereby obtained.

A battery A according to the invention of "button cell" type, typically such as that marketed under the reference CR2032, is then made with the following components:
- a positive electrode 1 as described immediately above;
- a separator 2 impregnated with a liquid electrolyte based on LiTFSI salt (1 mol·L$^{-1}$) in solution in a 50/50 mixture by volume of TEGDME (tetraethylene glycol dimethyl ether)-DIOX (dioxolane).
- a 130 µm thick negative lithium electrode 3, cut to 16 mm diameter and deposited on a stainless steel disc forming the negative current collector.

Comparative Example 2

An ink is made from:
active material (elementary sulphur such as the "Refined", marketed by the firm Aldrich);
carbon black (Super P®, marketed by the firm Timcal);
binder (polyvinylidene difluoride or PVdF, marketed by the firm Solvay) dissolved in N-methylpyrrolidone (NMP).

The ink is composed (by weight) of 80% sulphur, 10% carbon black and 10% binder. The quantity of NMP is adjusted to attain the optimal viscosity enabling easy deposition of the mixture. The ink is deposited by spread coating using a micrometric doctor blade on a 20 µm thick aluminium strip. The coating is then dried at 55° C. for 24 h under air then cut into 14 mm diameter pellets: the positive electrode 1 of this comparative example 2 is thereby obtained.

A battery A according to the invention of "button cell" type, typically such as that marketed under the reference CR2032, is then made with the following components:
- a positive electrode 1 as described immediately above;
- a separator 2 impregnated with a liquid electrolyte based on LiTFSI salt (1 mol·L$^{-1}$) in solution in a 50/50 mixture by volume of PEGDME (polyethylene glycol dimethyl ether)-DIOX (dioxolane).
- a 130 µm thick negative lithium electrode 3, cut to 16 mm diameter and deposited on a stainless steel disc forming the negative current collector.

Comparative Example 3

The source of positive active material may also be introduced within the porous substrate 1 formed by the collector by vapour phase deposition or by immersion of the foam in liquefied sulphur.

Figure 4:
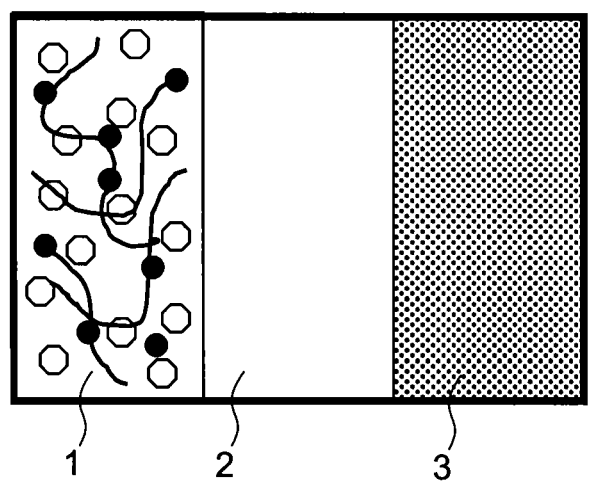
FIG. 4 is a schematic representation also in transversal section of a Li—S electrochemical battery according to the prior art (comparative example 3)

Similarly, just like conventional spread coating, an ink may also be deposited by a technique known as "doctor blade coating" on the porous collector. This technical solution is in particular disclosed in patent application US 2002/0106561 A1. It then impregnates the collector 1. All other printing techniques (serigraphy, flexography, etc.) may also be envisaged. Such a battery A according to the prior art with positive electrode 1 with the source of active material is shown schematically in FIG. 4.

The positive electrode 1 is thus here made from:
an ink, made from the active material (elementary sulphur such as the "Refined", marketed by the firm Aldrich), carbon black (Super P®, marketed by the firm Timcal), a binder (polyvinylidene difluoride or PVdF, marketed by the firm Solvay) dissolved in N-methylpyrrolidone (NMP);
carbon foam (Glassy Carbon Plate SR®, marketed by the firm Showa Denko).

The ink is composed (by weight) of 80% sulphur, 10% carbon black and 10% binder. The quantity of NMP is adjusted to attain the optimal viscosity enabling easy deposition of the mixture. The ink is deposited by spread coating using a micrometric doctor blade on the carbon foam collector. Through penetration, the ink impregnates the carbon foam and enables the deposition of the sulphur in the pores of the collector. The collector impregnated with ink with the sulphur deposited in the pores is then cut in the form of a pellet to 14 mm diameter: the positive electrode 1 of this comparative example 3 is thereby obtained.

A battery A according to the invention of "button cell" type, typically such as that marketed under the reference CR2032, is then made with the following components:
- a positive electrode 1 as described immediately above;
- a separator 2 impregnated with a liquid electrolyte based on LiTFSI salt (1 mol·L$^{-1}$) in solution in a 50/50 mixture by volume of TEGDME (tetraethylene glycol dimethyl ether)-DIOX (dioxolane).
- a 130 µm thick negative lithium electrode 3, cut to 16 mm diameter and deposited on a stainless steel disc forming the negative current collector.

The electrochemical performances of examples 1 to 4 of the battery A according to the invention are then compared to those of the comparative examples 1 to 3 according to the prior art.

Figure 5:
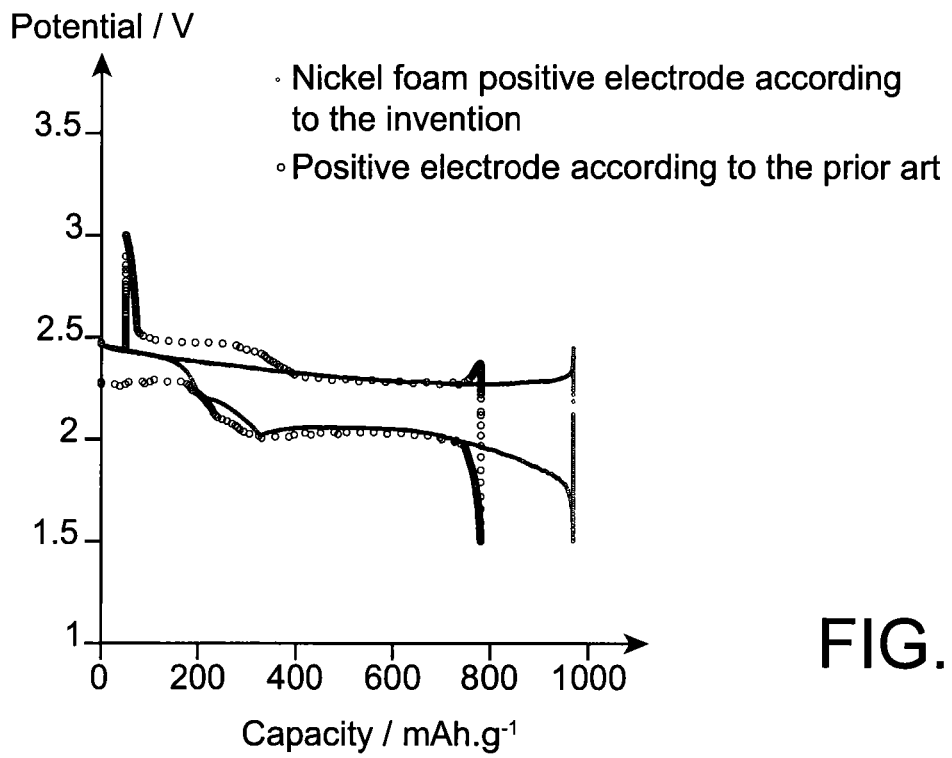
FIG. 5 represents the first cycling curves of a Li—S electrochemical battery respectively according to the invention (example 1) and according to the prior art (comparative example 1) in C/100 cycling regime.
Figure 6:
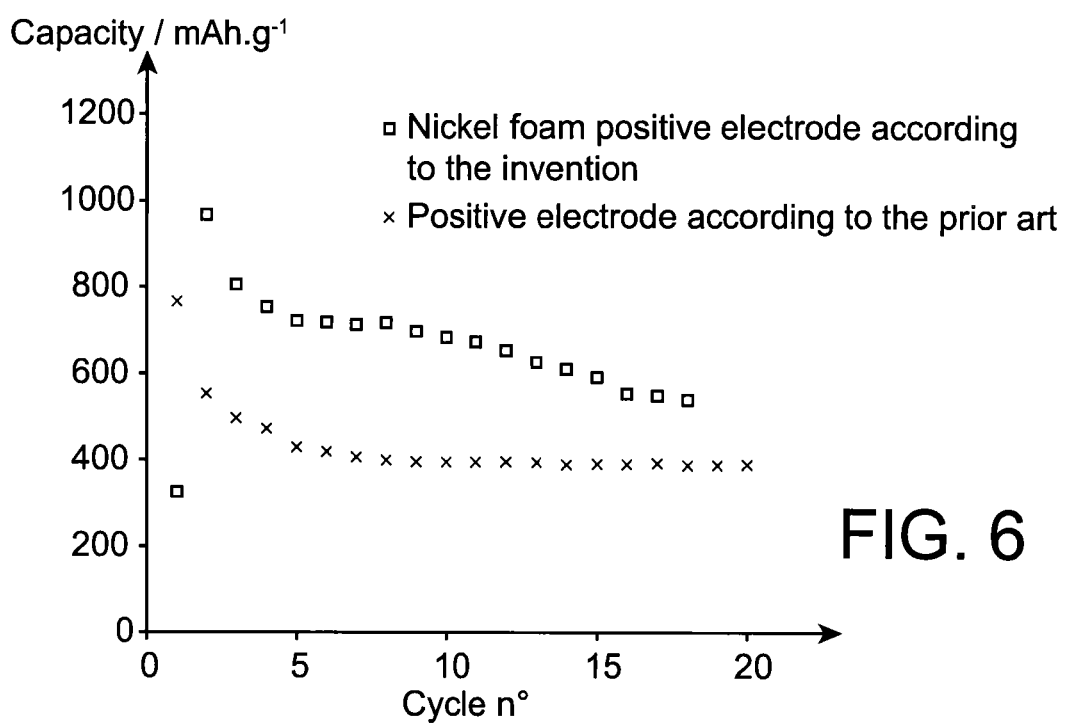
FIG. 6 represents the cycling stability curves of a Li—S electrochemical battery respectively according to the invention (example 1) and according to the prior art (comparative example 1) in C/100 cycling regime.

The first cycling and cycling stability curves of the batteries A made in example 1 and comparative example 1 are shown in FIGS. 5 and 6. It may be clearly seen from these curves that:
- the mass storage capacity is clearly improved by using a positive electrode according to the invention since for said electrode it is 1000 mAh·g$^{-1}$ against 800 mAh·g$^{-1}$ for the positive electrode according to the comparative example 1;
- the cycling stability is considerably improved by using a positive electrode according to the invention, since for said electrode the capacity is 700 mAh·g$^{-1}$ still available after a number equal to ten cycles, against a capacity only of 400 mAh·g$^{-1}$ for the positive electrode according to the comparative example 1.

Figure 7:
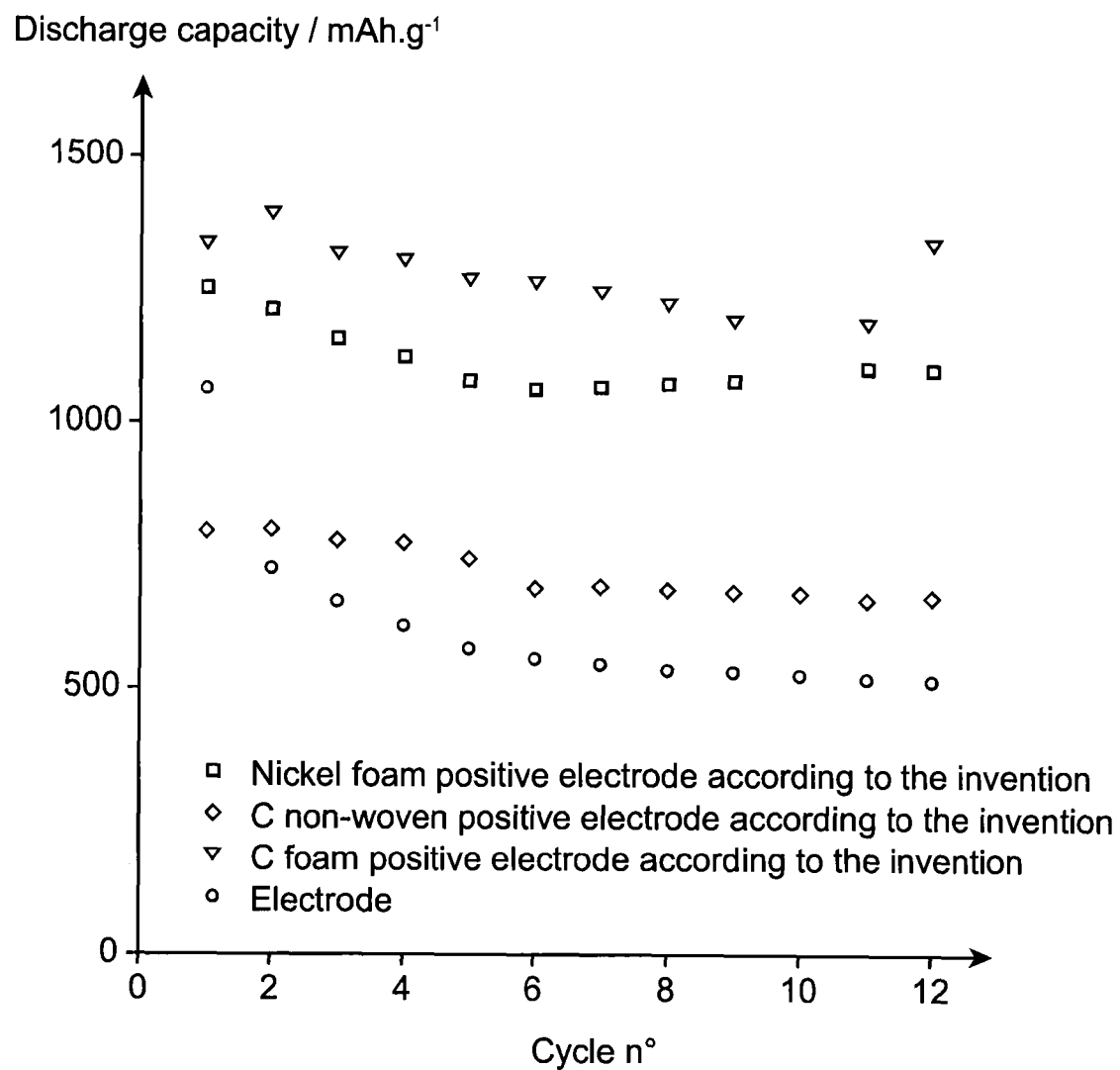
FIG. 7 represents the cycling stability curves of an Li—S electrochemical battery respectively according to the invention (examples 2, 3 and 4) and according to the prior art (comparative example 2) in C/100 cycling regime.

The discharge capacities as well as the cycling stability of the batteries A according to the invention made in examples 2, 3 and 4 are shown in the form of curves in FIG. 7 by comparison with those of battery A made in the comparative example 2. It is clear from this FIG. 7 that the discharge capacities and the cycling stability are increased by using a positive electrode according to the invention compared to a positive electrode according to the comparative example 2.

Thus, it may be deduced therefrom that the porosity and the rigidity of the current collectors according to the invention confer to Li—S type batteries a better discharge capacity, on account of the important available electrode surface, and better cyclability, on account of the rigidity and hence the conservation of the electrode morphology during cycling.

More particularly, by comparing examples 2 to 4 according to the invention in FIG. 7, it may be observed that carbon and nickel foams as porous substrate forming the positive current collector according to the invention seem to be the most effective, offering in all likelihood a greater developed collector surface area. The curves of FIG. 7 thus illustrate charge capacities obtained of the order of 1200 to 1400 mAh·g$^{-1}$ for a positive electrode made of nickel foam or carbon foam (examples 2 and 3) during the first cycles, against 800 mAh·g$^{-1}$ obtained for a positive electrode according to comparative example 2. Similarly, after a number of ten cycles, the restored capacity remains close to 1100 mAh·g$^{-1}$ for a positive electrode made of nickel foam (example 2), against only 550 mAh·g$^{-1}$ obtained for a positive electrode according to the comparative example 2.

Concerning the comparative example 3, as described in the aforementioned patent application US 2002/0106561 A1, the performances are again much lower than those obtained for the comparative examples 1 and 2, since only 55 mAh·g$^{-1}$ are obtained as restored capacity in first discharge in the same cycling conditions as those used previously. This battery A geometry described in comparative example 3 is thus not satisfactory in terms of mass energy density.

REFERENCES CITED

[1]: J. M. Tarascon, M. Armand, *Nature,* 414 (2001) 359-367;
[2]: L. Nazar et al., *Chem. Mater.,* 22 (2010) 691-714;
[3]: R. D. Rauh et al., *J. Electrochem. Soc.: Electrochem. Science and Technology,* 126 (1979) 523-527;
[4]: J. Shim et al., *J. Electrochem. Soc.,* 149 (2002) A1321-A1325;
[5]: Y.-J. Choi et al., *J. Power Sources,* 184 (2008) 548-552;
[6]: S.-E. Cheon et al., *J. Electrochem. Soc.,* 150 (2003) A796-A799;
[7]: L. Nazar et al., *Nature Mat.,* 8 (2009) 500-506;
[8]: N. J. Dudney et al., *Chem. Mater.,* 21 (2009) 4724-4730;
[9]: D. R. Chang et al., *J. Power Sources,* 112 (2002) 452-460;
[10]: B. Jin et al., *J. Power Sources,* 117 (2003) 148-152;
[11]: D. Marmorstein et al., *J. Power Sources,* 89 (2000) 219-226;
[12]: R. Backov, "Chimie intégrative: interdisciplinarité en sciences chimiques", *Techniques de l'ingénieur, de l'ingénieur,* 7 (2008) RE 105 1-16;
[13]: R. D. Rauh et al., *J. Electrochem. Soc.: Electrochem. Science and Technology,* 126 (1979) 523-527;
[14]: J. M. Tarascon, M. Armand, *Nature,* 414 (2001) 359-367;
[15]: D. Aurbach et al., *J. Electrochem. Soc.,* 156 (2009) A694-A702.

The invention claimed is:

1. A lithium-sulphur electrochemical battery, comprising:
a positive electrode,
a negative electrode and,
a separator inserted between the positive electrode and the negative electrode and impregnated with an electrolyte in liquid or polymer gel form,
wherein
the positive electrode is made solely from a porous electronic conductor substrate forming a current collector,
the electrolyte comprises a lithium polysulphide $Li_2S_n$ as a source of lithium and sulphur ions, and
the lithium polysulphide is formed ex-situ.

2. The lithium-sulphur battery according to claim 1, wherein the positive electrode is made from a metal or carbon based foam.

3. The lithium-sulphur battery according to claim 2, wherein the metal is selected from the group consisting of nickel Ni, aluminium Al, and stainless steel.

4. The lithium-sulphur battery according to claim 1, wherein the positive electrode is made from a non-woven fabric based on carbon fibres.

5. The lithium-sulphur battery according to claim 1, wherein the positive electrode is made from entangled metallised polymeric fibres.

6. The lithium-sulphur battery according to claim 1, wherein the negative electrode comprises a current collector substrate on which is deposited a negative electrode material selected from the group consisting of graphite, silicon, tin, and lithium.

7. The lithium-sulphur battery according to claim 1, wherein the electrolyte further comprises a lithium salt selected from the group consisting of $LiN(CF_3SO_2)_2$, $LiCF_3SO_3$, $LiClO_4$, $LiAsF_6$, $LiPF_6$, $LiBF_4$, $LiI$, $LiR_FSO_3$, $LiCH_3SO_3$, $LiN(R_FSO_2)_2$, $LiC(R_FSO_2)_3$, $LiB(C_2O_4)_2$, and $LiN(CF_3CF_2SO_2)_2$, where $R_F$ is a perfluoroalkyl group comprising one to eight carbon atoms.

8. The lithium-sulphur battery according to claim 7, wherein
the electrolyte is liquid, and
the lithium salt is dissolved in a solvent or a mixture of organic solvents.

9. The lithium-sulphur battery according to claim 7, wherein
the electrolyte is a polymer-gel, and
the lithium salt is dissolved in a solid polymer composite, which optionally is polyethylene oxide, polyacrylonitrile, polymethylmethacrylate, polyvinylidene difluoride or a derivative thereof.

10. A method of producing a lithium-sulphur battery, the method comprising:
producing a positive electrode solely from a porous substrate forming a current collector; and
introducing into an electrolyte lithium polysulphides as a lithium and sulphur ions source,
wherein the lithium-sulphur battery comprises the positive electrode, a negative electrode, and a separator inserted between the positive electrode and the negative electrode and impregnated with the electrolyte in liquid or polymer gel form.

11. The method according to claim 10, wherein said introducing is carried out before introducing the electrolyte into the battery.

12. The method according to claim 10, wherein the lithium polysulphides are prepared ex-situ by a process comprising:
dispersing an elementary sulphur and lithium metal in a solvent, thereby obtaining a solution, and
adding the solution to the electrolyte.

13. The method according to claim 12, wherein
the electrolyte comprises lithium bis(trifluoromethanesulphonyl)imide,
the solvent comprises 1,3-dioxolane and polyethylene glycol dimethyl ether or tetraethylene glycol dimethyl ether, and
the lithium polysulphides are dissolved beforehand in polyethylene glycol dimethyl ether or tetraethylene glycol dimethyl ether.

14. The method according to claim 11, wherein the lithium polysulphides are prepared ex-situ by a process comprising:
dispersing an elementary sulphur and lithium metal in a solvent, thereby obtaining a solution, and
adding the solution to the electrolyte.

15. The method according to claim 14, wherein
the electrolyte comprises lithium bis(trifluoromethanesulphonyl)imide,
the solvent comprises 1,3-dioxolane and polyethylene glycol dimethyl ether or tetraethylene glycol dimethyl ether, and
the lithium polysulphides are dissolved beforehand in polyethylene glycol dimethyl ether or tetraethylene glycol dimethyl ether.

* * * * *